United States Patent [19]

Hill et al.

[11] 4,453,809

[45] Jun. 12, 1984

[54] SOUND MIXING SYSTEM FOR FILM SOUND EDITING

[76] Inventors: James W. Hill; Eugene N. Finley, both of 346 Corte Madera Ave., Corte Madera, Calif. 94925

[21] Appl. No.: 290,349

[22] Filed: Aug. 5, 1981

[51] Int. Cl.³ .......................................... G03B 31/00
[52] U.S. Cl. ...................................... 352/11; 352/5; 352/129; 369/83; 360/13
[58] Field of Search ................ 352/129, 5, 11; 369/4, 369/5, 83; 360/13; 179/1 B

[56] References Cited

U.S. PATENT DOCUMENTS

| | | | |
|---|---|---|---|
| 1,946,565 | 2/1934 | Baumann | 369/4 |
| 2,279,018 | 4/1942 | Wolfe | 369/4 |
| 2,402,095 | 6/1946 | Slyfield | 369/4 |
| 2,899,505 | 8/1959 | Dresser | 369/4 |
| 4,064,364 | 12/1977 | Veale | 179/1 B |
| 4,122,500 | 10/1978 | Bradford et al. | 360/13 |
| 4,201,895 | 5/1980 | Hill | 369/4 |

*Primary Examiner*—Monroe H. Hayes

[57] ABSTRACT

A separately packaged film sound editor mixer is disclosed which includes a plurality of low level audio signal input terminals adapted for connection to outputs from playback heads of a synchronizer. Magnetic tape preamplifiers are included for preamplification of the low level signals. The preamplified signals are connected through slide attenuators and muting switches to inputs of a first summing amplifier. The output from the first summing amplifier is connected to inputs of left and right channel summing amplifiers through a tone control circuit and a master attenuator of the slide type. A selector switch is included in the input for one of said magnetic tape preamplifiers whereby, in one switch position, an output from the synchronizer is supplied to the preamplifier, as mentioned above. In the other switch position, the preamplifier input is connected to another input terminal to the mixer through a variable attenuator, which input terminal is adapted for connection to an audio signal source from an upright editing machine, or the like, for mixing with signals from other playback heads of the synchronizer. Also, left and right channel input terminals are included with are connected through variable attenuators to inputs of said left and right channel summing amplifiers. A stereophonic signal source, such as the output from a stereophonic tape deck, may be supplied to the left and right channel input terminals for mixing with monaural signals from the first summing amplifier. The power supply for the mixer includes a ground lift switch for removal of the power ground prong of the three-prong power plug from the chassis of the mixer to prevent ground loop currents.

11 Claims, 3 Drawing Figures

SOUND MIXING SYSTEM FOR FILM SOUND EDITING

BACKGROUND OF THE INVENTION

When a scene is filmed in the production of a feature motion picture film, a sound recording of dialogue and sound effects is made on ¼ inch tape using a high quality tape recorder. This tape is re-recorded onto magnetic tape having sprocket holes along the length thereof of the same size and format as the picture film. In the industry, such magnetic tape is termed magnetic film or "mag" film. By use of magnetic film, synchronization between sound tracks and picture film may be readily maintained during the picture and sound editing processes.

Sound editing generally involves editing of dialogue, effects and music, each of which may be recorded on one or more magnetic films. For example, a separate reel of magnetic film is made for each actor's lines so that the level of each may be separately set. Thus, at the end of actor A's first line on a reel, the film is cut; this will become the "element" for A's dialogue. Actor B's element must be restored to the same length from the start mark as the original track, so an identical length of "fill" stock is spliced in ahead of B's first line. Now, if both reels are started from the beginning, and run synchronously, both actors' lines will be spoken at precisely the same moment in time as they were in the original recording. More fill is spliced onto the end of A's first line to make up for B's dialogue, and the process is continued to the end of the reel, so that two separate elements have been constructed, giving separate control over each.

At this stage, the jobs of effects editors and music editors are similar in concept to cutting dialogue; elements are built from individual effects or pieces of music. But none of them ends here: now qualitative judgements as to the useability of the tracks must be made. If B's first line was not delivered to the director's satisfaction, then dialogue replacement tracks will be made in a studio where the actor watches the scene while listening to his original dialogue on headphones. The whole scene is "looped", so that it runs over and over, and each time it goes by the actor can deliver the line again and have it recorded. The process is called Automatic Dialogue Replacement, or ADR.

These ADR tracks go to the dialogue editor, who may discard some as useless, and construct new elements of the rest, so that the director and sound mixer can select the take they want in the context of a rough mix of dialogue, effects and music. Their selection goes back to the cutting room to replace the offending line of the original element.

A new problem now arises: The background sounds of the original scene were not present in the ADR studio, so that if the ADR line is used as is, there will be a distracting loss of background or "atmosphere" during that line. Since there is no way to separate the original background atmosphere from the bad line, the editor must somehow reconstruct the atmosphere and merge it in, mix it, with the ADR line to make it sound similar enough to the original that a difference will not be noticeable or distracting. This might be done by reproducing a section of the original track with no dialogue or other non-atmosphere sound, or by construction of a whole separate atmosphere element for the scene using tapes from the sound library. Either way, the editor has a new element, a separate reel labeled "atmosphere". The level on this element is far lower than the dialogue or effects; it must be mixed in carefully in the studio to match exactly the other atmosphere. Music and effects editing each have their peculiar complexities and nuances; but, they are similar to dialogue in that all three involve the creation of many elements and the detection and elimination of all possible flaws.

Each track becomes a complete, separate reel of magnetic film the identical length of the picture reel and synchronized to it. Their common destination is the mixdown theatre, which contains a motion picture projector and a number of magnetic film transports (dubbers) for the sound, which can be run in absolute synchronization with the picture projector. The sound mixer, whose responsibility is the final sound of the film, has a mixing console which enables him to adjust the level and tone (equalization) of each track, as well as overall loudness. He listens to his work on a high quality sound system capable of high sound levels and full frequency reproduction of all tracks; any sound present on those tracks will be heard and is subject to detailed scrutiny. Additional audio processing equipment such as graphic equalizers, time delays, compressors, and the like, is available for use on any track or element the mixer desires. Pops, clicks, abrupt transitions, and other extraneous background noise not detected and eliminated by the sound editor are detected in the mixdown theatre by the sound mixer, and will be sent back to the sound editor for correction.

Equipment for use by sound editors includes an editorial bench with shelves at the rear for reels of film and miscellaneous supplies. At the left and right ends of the bench, on the front, are two hand-crank film rewinds. A reel of film is loaded onto one rewind, and an empty reel onto the other. The film is threaded onto the empty reel and wound onto it by turning the crank.

On the way from one reel to another, the film usually passes through a synchronizer; this is a device which has several sprocket wheels which can propel, or be turned by, the film. The wheels all attach to a common horizontal shaft and a mechanical footage counter, and can be driven with a handle at the front of the unit. Film sits flat as it traverses the synchronizer, so that the picture can be scrutinized from above. A spring-loaded gate with guide rollers is pushed down and locked on top of the film to keep the sprocket holes in the film engaged with the teeth on the wheel. Other sprocket wheels of the synchronizer are used to drive magnetic film in synchronization with the picture film. A spring-loaded gate with guide rollers is associated with each of these sprocket wheels to maintain the magnetic film in engagement with the teeth on the wheels. A magnetic tape playback, or pickup, head is attached to a pivotally mounted arm carried by the magnetic film gates for pivotal movement of the heads into and out of engagement with the associated magnetic film. A typical synchronizer comprises a track for the picture film and three or four tracks with playback heads for magnetic film.

Cables from the playback heads of the synchronizer plug into a sound reader comprising a signal mixer and amplifier termed a "squawkbox" in the trade. Separate level controls are provided for signal level control of the low-level signals from the pick up heads at the sound reader.

A film splicer and grease pencils for marking the tracks complete the compliment of equipment of the editing bench.

Off to one side of the bench, on the floor, an upright editing machine often is provided, which is used to magnify the picture for viewing and to run the film at standard film speed. It contains a sound track reader for magnetic film, and a self-contained preamplifier, amplifier and speaker. A monaural headphone jack is provided. A magnetic tape playback head is mounted on a hinged arm on top of a film gate, similar to the pick up head mountings included in the synchronizer. The upright editing machine generally includes a good projector movement, but it is not acoustically isolated, and so it is quite noisy. The sound editor uses this machine to synchronize sound tracks to the picture, to determine whether sounds on the track occurred on or off camera, to audition tracks against the picture, and generally for any task requiring close viewing of the film.

The mechanical, electronic, and operational problems inherent in editorial devices are many and of the sorts which conspire to make difficult the job of building elements, judging their quality, and cleaning them up for the mix. Signals from tape playback heads are very small and must be amplified several orders of magnitude to be useful. In the cutting room these signals lead a perilous life.

A tape splicer can become magnetized, leaving a click or pop on the track at every splice. These can be virtually inaudible on the cutting bench equipment, yet quite obvious in the mixdown theatre, for reasons detailed below.

The alignment of tape heads on professional equipment is critical; a few thousandths of an inch misalignment can result in an order of magnitude or more of signal loss across the audio spectrum or in high frequency response. The mounting of heads on synchronizers and upright editing machines was not designed for precision but for ease of film handling, and the more the heads are flung out of the way, the worse the alignment becomes. Consequently, anything which reduces the moving of heads is desirable.

In studio tape transports, leads from tape heads are kept as short as possible, and heavily shielded to minimize pickup of hum, motor noise, etc. On the editorial bench, leads from synchronizer to sound reader may be several feet long and terminated in unshielded plugs. Any nearby source of hum, or noise, such as the AC power cord for the sound reader, which is usually plugged into the convenience outlet at the back of the bench, will be picked up and amplified.

The metal boxes into which sound readers are built are usually considered sufficient shield against external electromagnetic radiation, and the internal wiring of the tape leads is left unshielded. This results in several problems: the unit's own power transformer and rectifier can induce a strong hum, which at high levels of amplification can literally drown the audio signal; stray capacitance and inductance effects cause spurious oscillation, usually a high-pitched squeal that happens when the volume is turned up more than 60 or 70 percent. The presence in the box of a speaker, which draws a fair amount of current, can increase the problem to a point where it cannot be solved without resorting to elaborate and expensive electromagnetic shielding techniques. Most existing devices have at least one of these problems, and little has been done to correct them.

The speakers built into the sound readers are usually low quality; and the principles of acoustics seem to indicate that a small, undamped, unsealed metal box is hardly a good speaker cabinet. The frequency response is limited to midrange and any low bass or high treble sounds, such as pops, bumps of the microphone, generator motor noise, and wind noise, cannot be heard on the sound reader speaker, but will be heard (sometimes with a vengeance) in the mix theatre's full-range system.

Tape playback heads are a reactive electronic component; their output level and frequency response are sensitive to the electronic load presented to them. Prior art sound readers sum the low level playback head signals together passively into a single tape preamplifier. A passive summing network has a major drawback for a low-level signal such as this: in a properly designed summing network each time the number of inputs doubles, the level from any one input decreases by half, even if some inputs are unused. If the network is improperly designed, the tape heads serve as loads for each other; one head alone would be fine, but if two or more are connected, they each load the others, and now the load is reactive, with the resultant degradation of frequency response piled on top of the signal loss. In both cases the signal to noise ratio suffers, since the noise output of the circuit is constat while the input signal has been reduced.

Level control for individual channels is done by further attenuating the input signal; this further degrades the signal to noise ratio. For the editor all of this means that very low level signals are buried under hum and hiss, and they simply give up the ability to mix in favor of simply being able to hear.

As mentioned earlier, the upright editing machine is loud when picture is running. In a small untreated editing room the sound must be turned up quite loud to overcome it, or else the editor must use headphones. Use of headphones with the upright editing machine has a peculiar pitfall: the amplifier has a fairly high electronic noise floor, which, although adequate for the speaker, causes a problem for the headphones. Most headphones are so sensitive that the small voltage required to drive them forces the upright editing machine amplifier to operate annoyingly near its noise floor.

The results of all the above problems are that high quality location sound tracks are seriously degraded and distorted in the cutting room. If the process simply involved synchronizing the tracks to the picture, this might be acceptable; but, since the editors have the greater problem of matching low level atmospheres and finding low level flaws, it becomes evident that their equipment is far from ideal.

If the editorial environment is considered as a system whose product is destined for high-technology mixdown theatre, some extra operational problems can be noted.

In the selection of tracks it is frequently desirable to be able to mix different tracks to appropriate levels, in order to tray a "scratch mix," to see how the effect or music will sound in the context of the rest of the sound track. At times it is necessary to mute some tracks or to solo one. With existing devices this is done either by reducing the level on the particular track or tracks to zero (thereby losing preset levels for those tracks) or by lifting the tape heads off the unwanted tracks (hastening the misalignment of the tape heads).

The use of headphones precipitates some other problems:

a. Existing editorial devices come equipped with a monaural headphone jack. All decent quality headphones which are readily available today are stereophonic, and when plugged into a monaural jack they receive sound on one earpiece only. The purchase of a mono-stereo adaptor currently solves this problem.

b. When the editor decides to change from the sound reader to the upright editing machine, he has to unplug the headphones from the "squawkbox" at the back of the bench, disentangle the cord from the tracks, and plug it into the upright editing machine; or else use two sets of headphones and switch between the two. (The latter can be ludicrous with the entanglement of cords, tracks, and film. In fact it is not an efficient way to work.)

c. Music and effects cutters sometimes like to use a ¼ inch stereo tape deck handy to audition potential tracks. This practice saves them trips to the sound effects library or time spent waiting for transfers to be made, and it allows then to audition effects against the picture. In order to try them in context, however, they have to listen to the audition track over headphones or a stereophone speaker system while hearing the remainder over the upright editing machine speaker. This is a crude way of mixing, since the track from the upright editing machine has to be loud enough to overcome the film clatter, and the tape deck may not drive headphones very loud. A real audition is not possible in the cutting room, and often the track to be auditioned must be transferred to magnetic film, taken to the mix theatre, and put up with picture and the rest of the sound track. A lot of time and film is wasted in the process. An additional annoyance for headphone users is that the monoaural adaptor has to be unplugged to use the phones with the stereophonic tape deck.

Some contemporary sound editors have taken to using an external stereophonic amplifier and speakers to supplement their editorial systems, particularly for effects and music cutting. They quickly encounter the problem that none of the old editing room equipment is designed to interface with a modern audio system; piles of equipment quickly grow up on the back of the bench in the attempt to deal with the interface problem, taking up work space and hindering the physical efficiency of the bench.

Even with the successful interface of the stereo system, the problem still remains that the equipment is still too spread out to be operated conveniently from one location. The editor constantly has to lean over the bench or turn around to get at the appropriate control, and he still loses some of the efficiency originally intended in the bench arrangement.

SUMMARY OF THE INVENTION AND OBJECTS

An object of this invention is the provision of a new and novel sound mixing system for use in sound editing of motion picture film which avoids many of the shortcomings and disadvantages of prior art sound readers employed in sound editing systems.

An object of this invention is the provision of a sound mixing system of the above-mentioned type which physically is small enough to be operated entirely with one hand, without need of visual contact by a familiar operator, and which is small enough to be placed anywhere on the sound editing bench.

An object of this invention is the provision of a sound mixing system of the above-mentioned type which achieves far better signal-to-noise performance than prior art sound readers.

An object of this invention is the provision of a sound editing system of the above-mentioned type which provides for mixing of monaural and stereophonic audio signals whereby effects and music editors can create scratch mixes in the sound cutting room using inputs from a stereophonic signal source such as a stereophonic tape deck.

An object of this invention is the provision of a sound editing system of the above-mentioned type which includes a separate plug-in power supply for supplying d-c operating voltages to systems components, which power supply includes means for disconnecting the system chasis from the a-c power source ground to avoid ground loop currents when associated components are included which are connected to the power source ground.

The above and other objects and advantages are achieved by use of an independently packaged audio signal mixing apparatus having a plurality of input connecting means for receiving low, middle, and high level audio input signals from sound editing equipment such as a sound synchronizer, stereophonic tape deck, upright editing machine, and the like. Low level audio signals from pick up heads included in a synchronizer are preamplified by separate magnetic tape preamplifiers. Slide type attenuators, or faders, are included in the output circuits of the preamplifiers for individual level control of the signals. On-off switches also are included in the preamplifier output circuits for muting any of the inputs without changing the preset level, and without manually moving a pick up head away from its associated track.

The level controlled signals from the magnetic tape preamplifiers are connected to a first summing amplifier for combining, or summing, the preamplified signals. A tone control circuit with means for separate control of bass, midrange and treble audio frequency signals is included in the output from the summing amplifier, together with a slide type attenuator for master volume control. The slide attenuators in each magnetic tape preamplier channel and the master attenuator in the summing amplifier output at the face of the unit provide the sound editor with an instant, graphic, view of the mixer level settings, providing quicker visual access than would be provided by, say, the use of rotary attenuators.

The tone and level controlled output from the first summing amplifier is supplied to left and right channel summing amplifiers. A pair of amplifiers responsive to the left and right channel summing amplifiers connect the summing amplifier outputs to left and right channel output terminals, respectively, to which terminals loudspeakers are readily connected. Another pair of left and right channel amplifiers connects the left and right summing amplifier outputs to a stereophonic headphone output jack into which a stereophonic headphone may be plugged for binaural listening to amplified outputs from the left and right channel summing amplifiers.

The audio signal mixer unit is provided with input connector means for receiving high level audio input signals, such as the amplified output signal from an upright editing machine. A variable attenuator is included in the high level input signal circuit for level control thereof. A switch movable between first and second positions is included in one input channel to the first summing amplifier. In the first and second switch positions the outputs from one of the magnetic tape preamplifiers and the high level signal attenuator, respectively, are connected to the first summing amplifier through a channel attenuator and muting switch.

Stereophonic audio signals from a tape deck, or the like, may be supplied to the mixer unit through left and right channel input connectors which are connected to inputs of the left and right channel summing amplifiers through right and left channel attenuators, respectively. Stereophonic signals may thereby be mixed with monaural signals from the synchronizer and/or upright editing machine for use by the sound editor in creating scratch mixes.

The invention, together with other objects and advantages thereof, will be better understood from the following detailed description when considered with the accompanying drawings.

BRIEF DESCRIPTION OF THE DRAWINGS

In the drawings, wherein like reference characters refer to the same parts in the several views.

Figure 1:
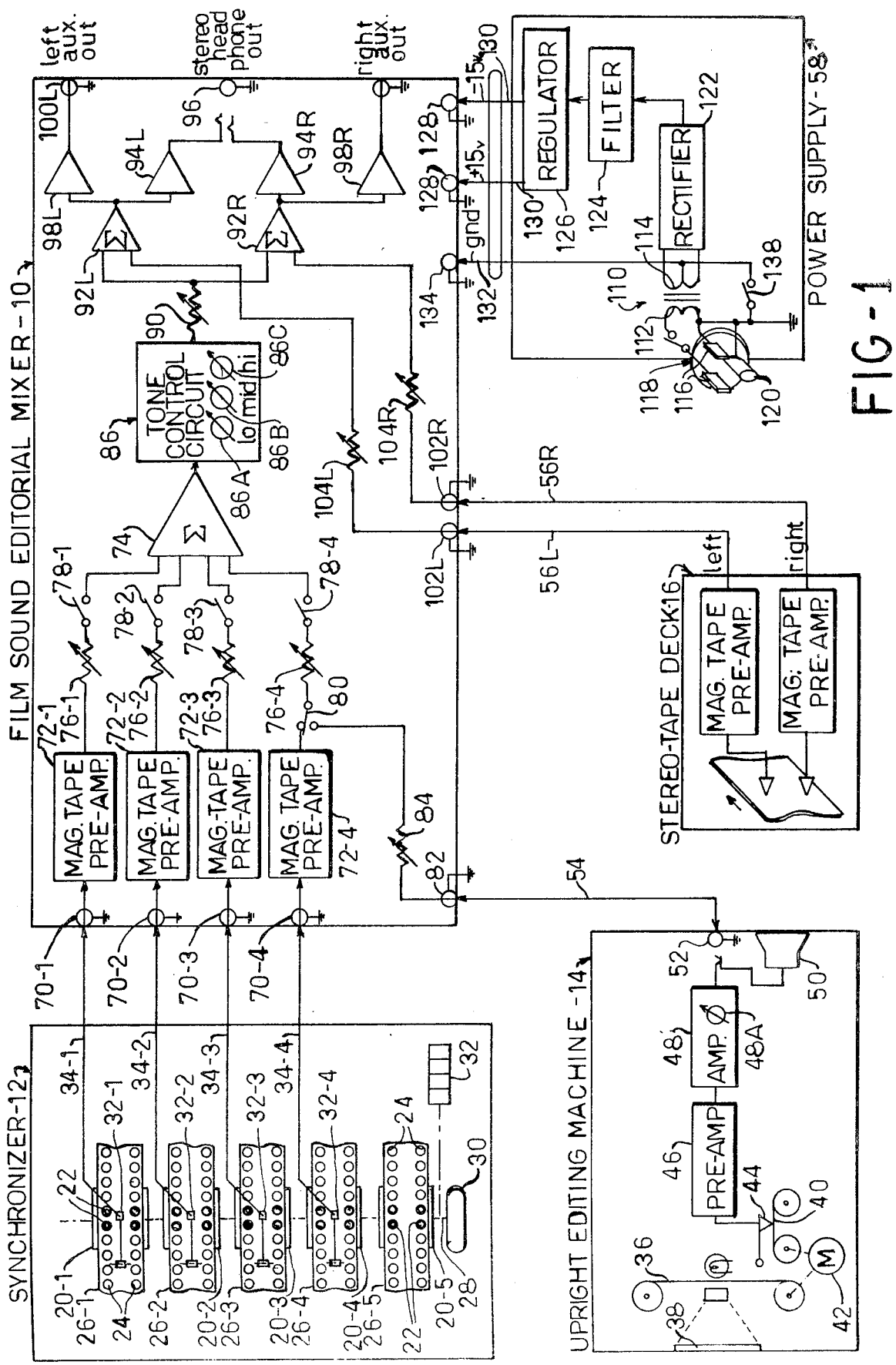
FIG. 1 is a schematic diagram showing an editorial audio signal mixer embodying the present invention, together with audio signal sources for supplying different level audio input signals thereto.

Reference first is made to FIG. 1 wherein an editorial audio signal mixer 10 is shown which is adapted for mixing different level audio signals from a plurality of different signal sources. In particular, the mixer is adapted to receive a plurality of low level signals, as from a synchronizer 12, a high level signal as from an upright editing machine 14, and intermediate level left and right channel stereophonic signals from a source such as a stereophonic tape deck 16.

A synchronizer, as is well known in the film sound editing art, includes a plurality of sprocket wheels 20-1 through 20-5 each of which includes parallel rows of drive pins 22 about the periphery thereof adapted for engagement with holes, or apertures, 24 formed along opposite edges of film 26-1 through 26-5, respectively. The sprocket wheels are attached to a common shaft 28 having a handle 30 at the forward end thereof for manual rotation of the shaft and synchronous rotation of the attached sprocket wheels 20-1 through 20-5. A mechanical footage counter 32 is connected to the shaft for counting the shaft rotation.

The sprocket wheels 20-1 through 20-4 are adapted for driving magnetic film 26-1 through 26-4, and the sprocket wheel 20-5 at the front of synchronizer is adapted for picture film 26-5. Only fragmentary portions of the film 26-1 through 26-5 associated with the synchronizer 12 are shown in FIG. 1. In practice, the picture film 26-5 is contained on a reel which is loaded onto a rewind at one side of the synchronizer. An empty reel is loaded onto another rewind at the opposite side of the synchronizer, and the film 26-5 is passed through the synchronizer. The rewinds are hand-cranked for manual movement of the film 26-5 over the sprocket wheel 20-5 for drive rotation thereof, and for rotation of the attached wheels 26-1 through 26-4 in either rotary direction.

Each sprocket wheel is provided with a spring-loaded gate with guide rollers (not shown) for urging the film downwardly into engagement with the wheels to maintain the holes 24 in engagement with the pins. The four tracks for magnetic film 26-1 through 26-4 have magnetic tape pick up, or playback, heads 32-1 through 32-4 pivotally attached to the associated gates, not shown, whereby the heads may be movable into and out of engagement with the strip of magnetic recording material included on the films. The playback heads are pivoted out of the way to allow for marking of the magnetic film. With prior art sound readers, it was necessary to lift the head for muting of the track. Low level audio signals from the synchronizer 12 are supplied over cables 34-1 through 34-4 to low level input terminals of the mixer 10. Typically, synchronizers include three or four magnetic film tracks; the illustrated synchronizer including four such tracks.

The upright editing machine 14 commonly is employed in sound editing of motion picture film. It comprises a motion picture projector movement including a film transport mechanism for driving a motion picture film 36, and means for projecting a film image on a viewing screen 38. It also includes a sound reader track for magnetic film 40. The picture and sound films 36 and 40 are driven through suitable connecting linkage by a motor 42. A tape playback head 44 is pivotally mounted on a pivotally mounted film gate, similar to mountings included in the synchronizer 12. A preamplifier 46 and amplifier 48 in the editor amplify the low level audio signal from the pick up head 44, for driving a loudspeaker 50. A monaural headphone jack 52 is included in the amplifier output for listening by use of a monaural headphone set. Prior art sound editorial mixers made no provision for accepting high level audio input signals, including signals from an upright editing machine. With prior art arrangements the sound editor listened to the audio signal output from the loudspeaker 50, or by use of a headset plugged into jack 52. The projector movement of the upright editing machine 14 is noisy, requiring that the sound be turned up loud if the loudspeaker 50 is used. The use of headphones acoustically isolates the sound editor from the projection mechanism. However, headphones require only a small voltage to drive the same and, if the volume control 48A is turned down to a suitable signal level, the amplifier 48 operates annoyingly near its noise floor. The mixer 10 of the present invention is adapted to receive high level audio input signals, such as that from the upright editing machine 14, which is shown connected over line 54 to the mixer.

As noted above in the BACKGROUND OF THE INVENTION stereophonic sound from, say, a tape deck, often is used by sound editors to allow for auditioning of effects or music against the picture without first having to transfer the recorded signals onto magnetic film. Again, prior art editorial mixers included no provision for mixing stereophonic sound signals with audio signals from the synchronizer 12 and/or editing machine 14. With the present invention, the mixer 10 includes stereophonic input terminals to which right and left channel midlevel audio signals may be supplied for mixing with other signals. In FIG. 1 stereophonic signals from the tape deck 16 are shown supplied to the mixer 10 over lines 56L and 56R.

A novel power supply 58, described in detail below, provides the necessary supply voltages for electronic components included in the mixer 10 comprising, generally, linear integrated circuits.

Figure 2:
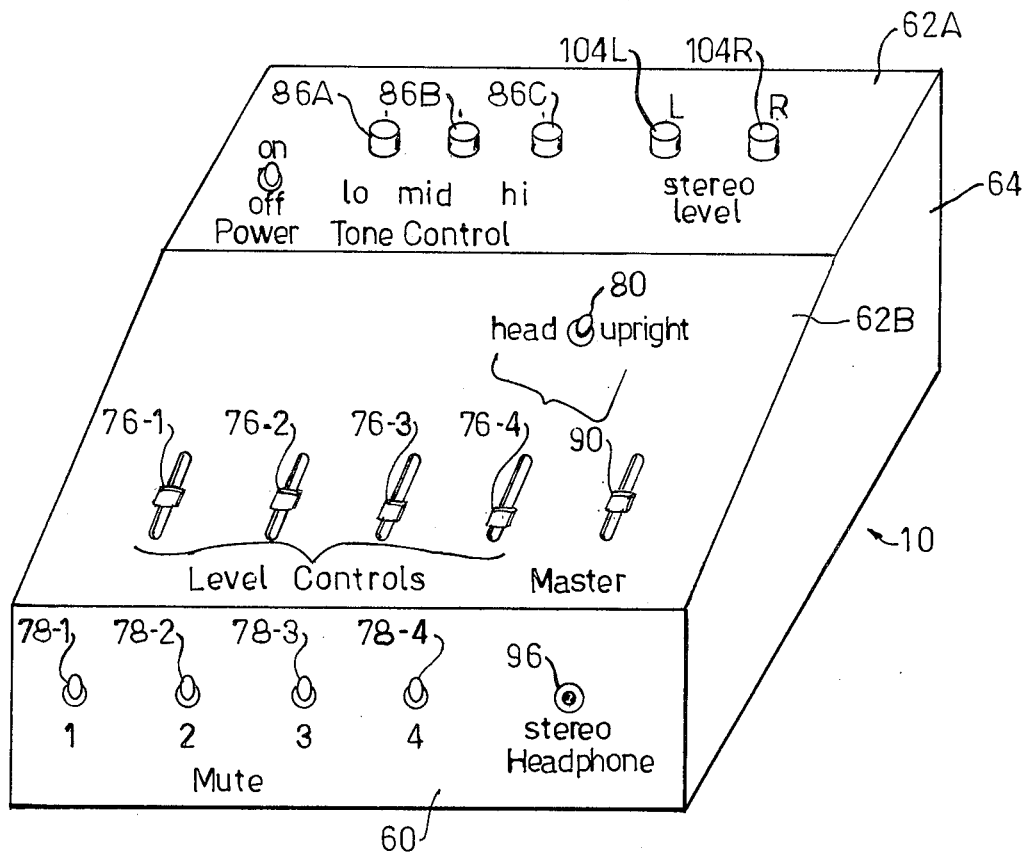
FIG. 2 is a perspective view showing front and top panels of the editorial audio signal mixer depicted in FIG. 1.
Figure 3:
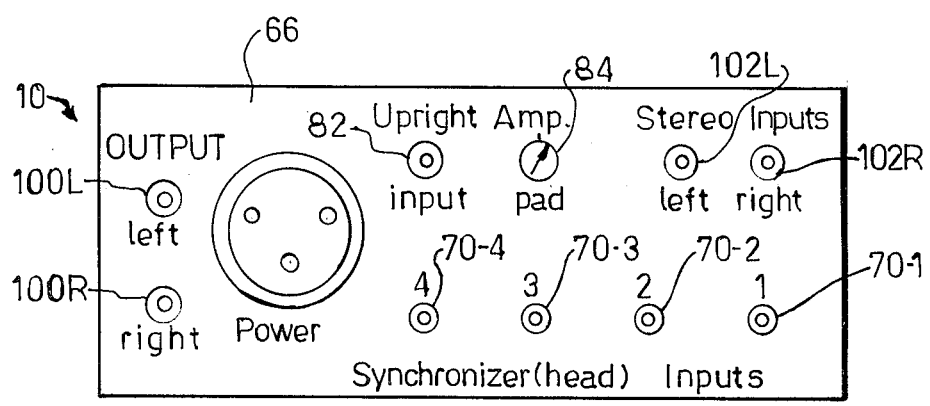
FIG. 3 is a rear elevational view of the editorial audio mixer shown in FIG. 2.

Reference now is made to FIGS. 2 and 3 wherein the novel mixer 10 is shown comprising a housing which includes a front panel 60, a top panel comprising a horizontal section 62A and inclined section 62B, side walls 64,64 (only one of which is seen in FIG. 2) and a rear panel 66, shown in FIG. 3. Most input and output terminals for the mixer are located at the back panel 66, and most controls are located at the front and top panels.

As seen in FIGS. 1 and 3, the mixer includes four low level audio input signal terminals 70-1 through 70-4 adapted for connection to the playback heads of a synchronizer. In FIG. 1, leads 34-1 through 34-4 are shown for connection of playback heads 32-1 through 32-4 to these input terminals. Physically, the terminals are located at the rear panel 66 of the mixer, as seen in FIG. 3, and are identified thereat as Synchronizer (Head) Inputs 1, 2, 3 and 4. As seen in FIG. 1, the playback head signals from the terminals 70-1 through 70-4 are directly connected to inputs of individual magnetic tape preamplifiers 72-1 through 72-4 for preamplification of the low level signals before mixing.

The amplified signals are preamplifiers 72-1 through 72-4 are adapted for connection to a summing amplifier 74 where the preamplified audio signals are added. Connections from the preamplifiers to the summing amplifier include attenuators 76-1 through 76-4 for individual signal level control of the signals supplied to the summing amplifier, and muting switches 78-1 through 78-4 for on-off control. As noted in FIG. 2, the attenuators are of the linear slide type, rather than rotary type, to facilitate visualization of the level settings. By preamplifying the low level audio signals from the playback heads 32-1 through 32-4, and summing the amplified signals using a summing amplifier, an improved signal-to-noise ratio is obtained. With this arrangement true audio mixing of the signals is provided at all level settings.

The summing amplifier 74 simply may comprise an operational amplifier with a negative feedback resistor and input, or summing resistors connecting the input lines to the input of the amplifier. In addition to providing means for muting selected channels without having to pivot playback heads away from the magnetic film, the muting switches 78-1 through 78-4 also function to remove the associated preamplifier and attenuator from the summing amplifier input thereby removing them as sources of noise when a channel is not used.

A selector switch 80 is included in one of the input lines to the summing amplifier 74 for selective connection of either the magnetic tape preamplifier 72-4 to the summing amplifier or a high level signal input thereto from an input terminal 82. In the illustrated switch position, the output from the preamplifier 72-4 is connected to linear slide attenuator 76-4. In a second switch position, the input terminal 82 is connected to the attenuator 76-4 through another attenuator 84. In the illustrated arrangement, wherein the audio signal output from an upright editing machine 14 is shown connected to the input terminal 82, it will be apparent that this output may be mixed with outputs from preamplifiers 72-1 through 72-3 at the summing amplifier. As noted above, the audio signal from the upright editing machine is obtained from the headphone level output jack 52 thereof for supplying a medium level signal input to the mixer. By including the attenuator 84 in the input, high level audio input signals may be accommodated. In practice, the attenuator 84 is adjusted to provide a signal level output therefrom within the range level of signals from the preamplifiers 72-1 through 72-4. The slide attenuator 76-4 then is used for adjustment of the level of signals to be mixed at the summing amplifier 74. When used with the editing machine 14, amplifier 48 is operated at a signal level for optimum signal to noise ratio of the amplifier by proper setting of the volume control 48A. The attenuator 84 then is set for a signal level compatible with the output levels of preamplifiers 72-1 through 72-3. As will become apparent, repatching of headphones is unnecessary in the use of the editing machine 14, with the present mixer of this invention.

The output from the summing amplifier 74 is supplied to a tone control circuit 86 which, in the illustrated arrangement, includes three sections for individual boost or cut in the bass, midrange, and treble regions of the mixed audio signal under control of potentiometers 86A, 86B and 86C, respectively. Such active tone control circuits, which include individual bandpass circuits for individual control of the low, middle, and high audio frequency ranges are well known in the art. A master attenuator 90 is included in the output from the tone control circuit for overall level control of the mixed signal output from the summing amplifier. As seen in FIG. 2, a linear slide type attenuator is used for master level control, which attenuator is located adjacent the individual channel control attenuator 76-1 through 76-4.

In accordance with another feature of the present invention the tone and volume controlled signal from the summing amplifier 74 is supplied to one input of left and right channel summing amplifiers 92L and 92R, respectively. The left and right channel signal outputs from summing amplifiers 92L and 92R are supplied to amplifiers 94L and 94R, respectively, and thence to left and right output terminals of a stereophonic headphone jack 96. A set of stereophonic headphones, not shown, is adapted for connection to the jack for binaural listening of monaural signals from the summing amplifier 74 by stereophonic headphone means. For loudspeaker use, the left and right channel signal outputs from the summing amplifiers 92L and 92R also are supplied to amplifiers 98L and 98R and thence to left and right channel auxiliary output terminals 100L and 100R, respectively. Separate loudspeakers, or the like, may be connected to these terminals for listening without earphones. With this arrangement, the sound editor may choose earphones and loudspeakers of a quality consistent with his tastes and needs.

As noted above, many studios maintain a library of stereophonic music and sound effects on ¼ inch recording tape. With the novel mixer of the present invention, the outputs from a stereophonic tape deck may be mixed with monaural signals from the synchronizer 12 and/or upright editing machine 14 to greatly facilitate auditioning by the sound editor of stereophonic music and sound effect tapes. As seen in FIG. 1 the mixer includes left and right channel input terminals 102L and 102R which are connected to inputs of the left and right channel summing amplifiers 92L and 92R, through attenuators 104L and 104R, respectively. In FIG. 1, these stereophonic input terminals are shown supplied with inputs from left and right magnetic tape preamplifiers included in the stereophonic tape deck 16. The attenuators 104L and 104R are accessible from the top panel 60A for individual adjustment of the stereophonic signal inputs to the summing amplifiers 92L and 92R. The left and right channel stereophonic signals at the summing amplifiers 92L and 92R are mixed with any monaural signal from the summing amplifier 74, and thence supplied to the stereophonic headphone jack 96 and left and right channel output terminals 100L and 100R through pairs of amplifiers 94L, 94R and 98L, 98R, as described above.

When a plurality of electronic devices having individual power supplies are interconnected, such as the mixer 10, upright editing machine 14, and tape deck 16, their chassis often are individually grounded to the AC power ground connection thereby creating a ground loop path which can induce hum into the system. The mixer power supply 58 is provided with a "ground lift" switch for disconnecting the mixer chassis and signal ground from the ground pin of the AC source for the power supply. As seen in FIG. 1 the power supply includes a transformer 110 having a primary winding 112 and centertapped secondary winding 114. The primary winding is connected to the power terminals 116,116 of a three-prong plug 118 which includes a ground terminal 120. Opposite ends of the secondary winding 114 are connected to a rectifier 122, the rectified output from which is filtered at filter 124. For additional filtering effect, a voltage regulator 126 is included in the output from the filter. For powering the integrated circuits of the mixer 10, ±15 v output voltages are obtained from the voltage regulator which are adapted for connection to input power terminals 128,128 of the mixer through conductors 130,130. From the terminals 128,128, power is distributed to the various components of the mixer through leads, not shown. Another conductor 132 connects the center tap of transformer secondary winding 114 to a ground terminal 134 at the mixer, which terminal is attached to the mixer chassis to provide a chassis ground. In accordance with another feature of this invention, an on-off switch 138 is included between the said center tap and the ground terminal prong 120 of the power plug 118. By opening the switch 138, the connection between the ground terminal prong and secondary winding of the transformer is broken. Now, grounding of the mixer chassis is provided through connection to one of the other devices such as the upright editing machine 14 of stereophonic tape deck 16. By providing only one power ground connection for the entire system ground current loop paths are avoided. The switch 138 simply facilitates lifting, or breaking, of the ground connection via ground terminal prong 120 of the mixer power supply.

The invention having been described in detail in accordance with requirements of the U.S. Patent Statutes, various changes and modifications will suggest themselves to those skilled in this art, which changes and modifications are intended to fall within the spirit and scope of the invention as defined in the appended Claims.

We claim:

1. A separately-packaged film sound editorial mixer for mixing audio signals from one or more audio signal sources such as a sound synchronizer having a plurality of magnetic tape playback heads which provide a plurality of low level audio signals, said mixer including,
    a plurality of low level audio signal input terminals adapted for connection to magnetic playback heads of a sound synchronizer, or the like,
    a plurality of magnetic tape preamplifiers connected to said low level audio input terminals for preamplification of low level input signals supplied thereto,
    a first summing amplifier,
    means including a plurality of individual manually controlled attenuator means for connecting the preamplifier outputs to inputs of said first summing amplifier,
    left and right channel amplifiers,
    means for connecting the output from said first summing amplifier to inputs of said left and right channel amplifiers whereby separate left and right channel audio signals are provided at the outputs of said left and right channel amplifiers, and
    a power supply for said mixer comprising:
    a three-prong plug having a pair of power terminals and a ground terminal adapted for connection with a three terminal ac power outlet which includes a pair of power terminals and a power ground terminal,
    a transformer having a primary winding connector to the power terminals of said three-prong plug, and a center-tapped secondary winding,
    a rectifier connected to the secondary winding for conversion of the secondary winding output to dc voltage for powering mixer components,
    means for connecting the secondary winding center tap to mixer components to provide a common ground, and
    a switch movable between switch open and closed positions for selectively connecting the secondary winding center tap to said ground terminal of said three-prong plug to prevent the flow of ground loop currents in the switch open position and for connection of the common ground to said power ground in the switch closed position.

2. An editorial mixer as defined in claim 1 wherein said left and right channel amplifiers comprise summing amplifiers, and
    means for connecting inputs of said left and right channel summing amplifiers to a source of left and right channel stereophonic audio signals for mixing with outputs from said first summing amplifier.

3. An editorial mixer as defined in claim 2 wherein said means for connecting inputs of said left and right channel summing amplifiers to a source of left and right channel stereophonic audio signals include variable attenuators for signal level control.

4. An editorial mixer as defined in claim 2 including a high level audio signal input terminal, and
    a manually operated selector switch movable between a first position for connecting one preamplifier output to said first summing amplifier and a second position for connecting said high level audio signal input terminal to said first summing amplifier for mixing with signals from others of said preamplifiers.

5. An editorial mixer as defined in claim 1 wherein said means for connecting the preamplifier outputs to inputs of said first summing amplifier also includes a plurality of individually manually controlled on-off muting switches for use in connecting and disconnecting outputs of individual preamplifiers to inputs of said first summing amplifier.

6. An editorial mixer as defined in claim 1 including, at least one high level audio signal input terminal, and a selector switch manually movable between first and second positions, said selector switch in said first and second switch positions connecting the output from one preamplifier and the high level audio signal input terminal, respectively, to one input of said manually controlled attenuating means whereby audio signal inputs from selected different sources may be supplied to one input of said first summing amplifier.

7. An editorial mixer as defind in claim 6 including a manually controlled attenuator in the connection of said high level audio input terminal to said selector switch for level control of audio input signals supplied to said first summing amplifier from said high level audio signal input terminal.

8. An editorial mixer as defined in claim 1 including tone control circuit means in the connection of the output from said first summing amplifier to said left and right channel amplifiers for tone control of mixed audio signals supplied to said left and right channel amplifiers.

9. An editorial mixer as defined in claim 1 including a master manually controlled attenuator in the connection of the output from said first summing amplifier to said left and right channel for level control of mixed audio signals supplied to said left and right channel amplifiers.

10. An editorial mixer as defined in claim 1 including a stereophonic head phone jack, and
means for connecting outputs from said left and right channel amplifiers to said jack.

11. An editorial mixer as defined in claim 1 wherein said mixer includes a control panel, and
said manually controlled attenuator means are located at said control panel and are of the linear slide type to facilitate instant graphic viewing of the settings thereof.

* * * * *